United States Patent
Begley

(10) Patent No.: US 8,709,204 B1
(45) Date of Patent: Apr. 29, 2014

(54) SYSTEM AND PROCESS FOR RECOVERING HEAT FROM WEAK BLACK LIQUOR IN A WOOD PULPING PROCESS

(71) Applicant: Veolia Water Solutions & Technologies North America Inc., Moon Township, PA (US)

(72) Inventor: Michael S. Begley, Lisle, IL (US)

(73) Assignee: Veolia Water Solutions & Technologies North America Inc., Moon Township, PA (US)

( * ) Notice: Subject to any disclaimer, the term of this patent is extended or adjusted under 35 U.S.C. 154(b) by 0 days.

(21) Appl. No.: 13/828,634

(22) Filed: Mar. 14, 2013

(51) Int. Cl.
*D21C 11/10* (2006.01)
*D21C 11/06* (2006.01)
*B01D 1/06* (2006.01)
*B01D 1/16* (2006.01)
*B01D 3/06* (2006.01)

(52) U.S. Cl.
CPC ............... *D21C 11/10* (2013.01); *B01D 1/065* (2013.01); *B01D 1/16* (2013.01); *B01D 3/06* (2013.01)
USPC ................ 162/47; 162/29; 162/46; 159/47.1; 159/48.1; 159/49

(58) Field of Classification Search
CPC .......... D21C 11/10; D21C 11/06; D21C 3/22; B01D 1/26; B01D 1/24; B01D 1/065; B01D 3/007; B01D 3/065; B01D 1/00; B01D 1/16; B01D 1/2846; B01D 3/06; B01D 1/02; Y10S 159/08; F24J 3/00
USPC .......... 162/29, 30.11, 32, 46–47; 159/3, 17.4, 159/47.3, 48.1–48.2, 49, DIG. 8, DIG. 22, 159/DIG. 32; 203/21–22, 24, 27; 165/168
See application file for complete search history.

(56) References Cited

U.S. PATENT DOCUMENTS

| | | | | |
|---|---|---|---|---|
| 1,983,789 A * | 12/1934 | Bradley et al. | ................... | 162/36 |
| 2,590,905 A * | 4/1952 | Tomlinson et al. | .......... | 159/4.02 |
| 2,840,454 A * | 6/1958 | Tomlinson et al. | ........... | 423/532 |
| 2,852,348 A * | 9/1958 | Moonan | ........................ | 422/185 |
| 2,976,273 A * | 3/1961 | Ball et al. | ...................... | 530/506 |
| 3,347,739 A * | 10/1967 | Tomlinson, II | .............. | 162/30.1 |
| 3,351,120 A * | 11/1967 | Goeldner et al. | ............ | 159/13.3 |
| 3,388,045 A * | 6/1968 | Goeldner et al. | ............ | 202/173 |
| 3,396,076 A * | 8/1968 | Crosby et al. | ................... | 162/33 |
| 3,425,477 A * | 2/1969 | Farin | ........................... | 159/48.2 |
| 3,456,709 A * | 7/1969 | Anders | ......................... | 159/4.02 |
| 3,607,619 A * | 9/1971 | Hess et al. | ................. | 162/30.11 |
| 3,638,708 A * | 2/1972 | Farin | ............................ | 159/47.3 |

(Continued)

FOREIGN PATENT DOCUMENTS

| WO | WO 9612848 A1 * | 5/1996 | ............. D21C 11/10 |
|---|---|---|---|
| WO | WO 9632531 A1 * | 10/1996 | ............... D21C 7/10 |

*Primary Examiner* — Jose Fortuna
(74) *Attorney, Agent, or Firm* — Coats and Bennett, PLLC

(57) ABSTRACT

A wood pulping process includes producing weak black liquor and cooling the liquor as well as recovering heat therefrom by directing the weak black liquor through a spray film evaporator. A feed or condensate is directed into the spray film evaporator and the feed or condensate is sprayed onto the outer surfaces of a bundle of tubes. This results in the feed or the condensate being vaporized and producing a vapor that can be utilized as a heat source for other processes in a pulp mill.

14 Claims, 3 Drawing Sheets

(56) References Cited

U.S. PATENT DOCUMENTS

| | | | |
|---|---|---|---|
| 4,188,260 A * | 2/1980 | Rowlandson et al. | 162/16 |
| 4,239,589 A * | 12/1980 | Elton et al. | 162/31 |
| 4,311,714 A * | 1/1982 | Goering et al. | 426/28 |
| 4,789,428 A * | 12/1988 | Ryham | 159/47.3 |
| 5,143,579 A * | 9/1992 | Field et al. | 162/30.1 |
| 5,277,759 A * | 1/1994 | Sannholm | 162/16 |
| 5,413,674 A * | 5/1995 | Ragi | 159/47.3 |
| 5,480,512 A * | 1/1996 | Sannholm | 162/16 |
| 6,123,806 A * | 9/2000 | Roberts | 162/14 |
| 6,132,555 A * | 10/2000 | Rikkinen et al. | 159/47.3 |
| 6,306,252 B1 * | 10/2001 | Ryham | 162/47 |
| 6,346,166 B1 * | 2/2002 | Kettunen et al. | 162/14 |
| 7,351,306 B2 * | 4/2008 | Lindstrom et al. | 162/19 |
| 7,384,501 B2 * | 6/2008 | Uusitalo et al. | 162/16 |
| 2003/0056910 A1 * | 3/2003 | Mullen et al. | 162/16 |
| 2004/0079498 A1 * | 4/2004 | Haaslahti et al. | 162/19 |
| 2004/0089431 A1 * | 5/2004 | Fant et al. | 162/29 |
| 2004/0154760 A1 * | 8/2004 | Dean | 162/18 |
| 2005/0103454 A1 * | 5/2005 | Lindstrom et al. | 162/19 |
| 2005/0115691 A1 * | 6/2005 | Lindstrom et al. | 162/19 |
| 2006/0201641 A1 * | 9/2006 | Harris et al. | 162/37 |
| 2007/0131363 A1 * | 6/2007 | Kettunen et al. | 162/29 |
| 2010/0236733 A1 * | 9/2010 | Tikka et al. | 162/68 |
| 2011/0198049 A1 * | 8/2011 | Kettunen et al. | 162/240 |

* cited by examiner

__US 8,709,204 B1__

SYSTEM AND PROCESS FOR RECOVERING HEAT FROM WEAK BLACK LIQUOR IN A WOOD PULPING PROCESS

FIELD OF THE INVENTION

The present invention relates to a wood pulping system and process, and more particularly to a system and process for recovering heat from weak black liquor and utilizing the recovered heat as a source of heat for one or more processes in wood pulping.

BACKGROUND OF THE INVENTION

Weak black liquor produced in a wood pulping process typically has a solids content of approximately 15% by weight, which is too low for combustion. To raise the solids content of weak black liquor, the weak black liquor is typically concentrated in multi-effect evaporators until its solids content is approximately 70-90%. Thereafter, the concentrated weak black liquor is referred to as black liquor. Concentrated black liquor is then directed to a recovery boiler where the black liquor is burned and in the process produces ash.

In the design of newer pulp mills, there is a desire to direct the weak black liquor from the digester to the evaporation system without cooling below its atmospheric flash point. This has the advantage of lowering the steam usage in the evaporation system. Current technology uses flash tanks or liquid-to-liquid heat exchangers to cool the weak black liquor prior to reaching the evaporation system. There are drawbacks and disadvantages to both approaches. First, the flash tanks are prone to foaming. The liquid-to-liquid heat exchangers, on the other hand, are prone to plugging with fiber. In addition, liquid-to-liquid heat exchangers also require a large volume of condensate or cooling water to cool the weak black liquor.

SUMMARY OF THE INVENTION

One embodiment of the present invention relates to a system or process for recovering heat from weak black liquor and utilizing the recovered heat in one or more processes of a wood pulping operation.

The present invention in another embodiment entails a system and process for pulping wood where weak black liquor, produced in the process, is cooled and heat is recovered therefrom and utilized in a multiple effect evaporation system to concentrate the weak black liquor. In this embodiment, the weak black liquor flows through tubes or conduits of a spray film evaporator, heating the tubes in the process. Condensate produced by the multiple effect evaporation system is sprayed onto the outside of the tubes, boiling the condensate. This produces a vapor that is routed to the multiple effect evaporation system where heat associated therewith is utilized in the multiple effect evaporation system to concentrate the weak black liquor.

Other objects and advantages of the present invention will become apparent and obvious from a study of the following description and the accompanying drawings which are merely illustrative of such invention.

DESCRIPTION OF EXEMPLARY EMBODIMENTS

The present invention relates to a wood pulping process that produces weak black liquor. In accordance with the present invention, the weak black liquor is directed through a spray film evaporator 10 that functions to recover heat from the weak black liquor. Recovered heat from the weak black liquor is utilized by one or more heat consuming processes that form a part of a pulp mill operation. See FIG. 1.

In one particular embodiment, the spray film evaporator 10 is utilized in a wood pulping process where the spray film evaporator is disposed between a digester 12 and an evaporation system 14. Weak black liquor produced by the digester 12 is directed into and through the spray film evaporator 10. Condensate produced by the downstream evaporation system 14, which is typically a multi-effect evaporator, is directed to the spray film evaporator 10. The condensate is sprayed on a bundle of tubes that form a part of the spray film evaporator 10. Heat associated with the weak black liquor is transmitted to the surface of the tubes. When the condensate is sprayed onto the tubes, this heat vaporizes the condensate and resulting vapor is collected and directed downstream to the evaporation system 14 where the vapor can be utilized in the evaporation system to concentrate the weak black liquor. See FIG. 2.

Figure 1:
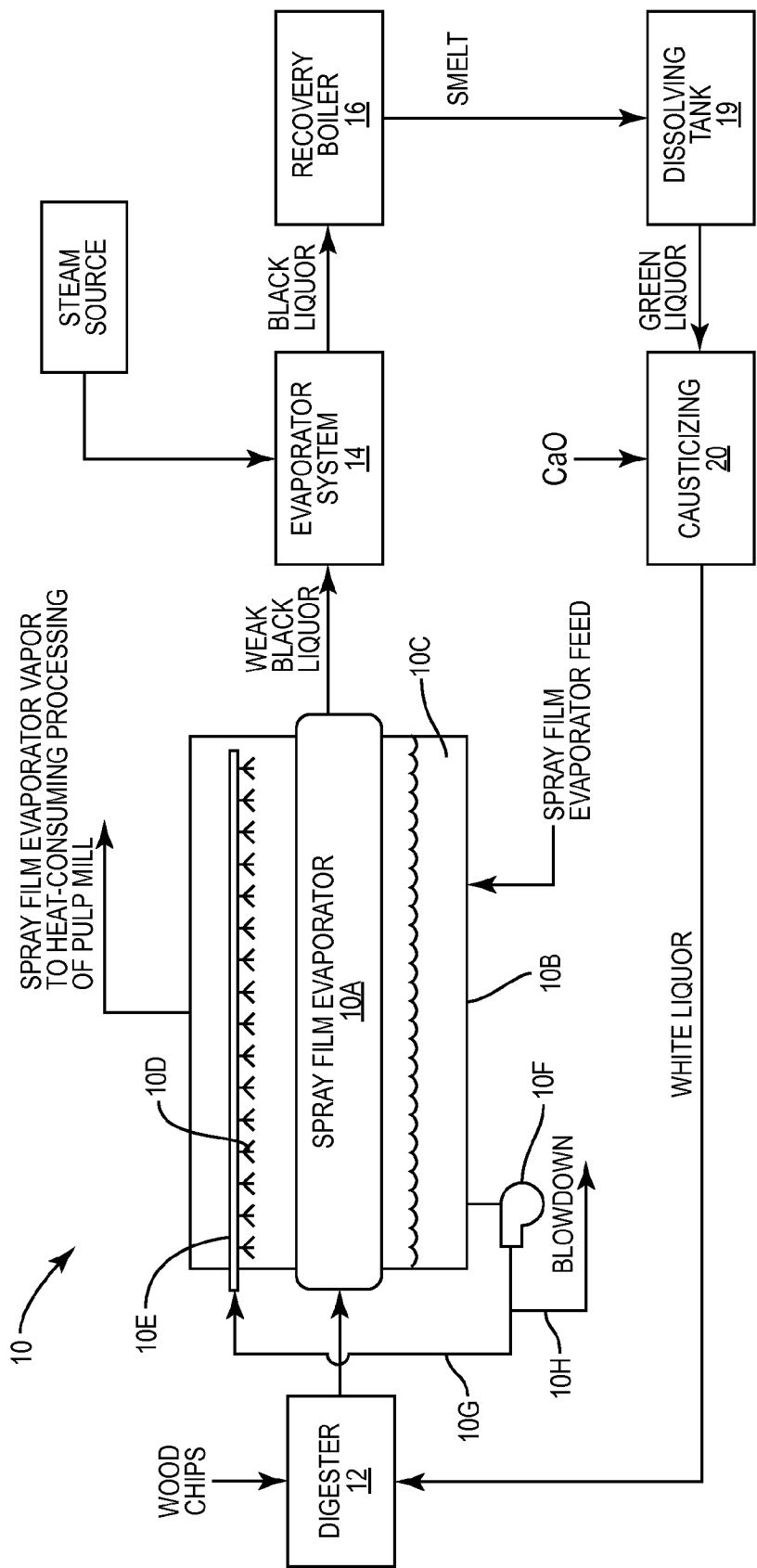
FIG. 1 is a schematic illustration of a wood pulping process where weak black liquor is cooled and, in the process, heat is extracted therefrom and the extracted heat can be used in other processes of the wood pulping operation.
Figure 2:
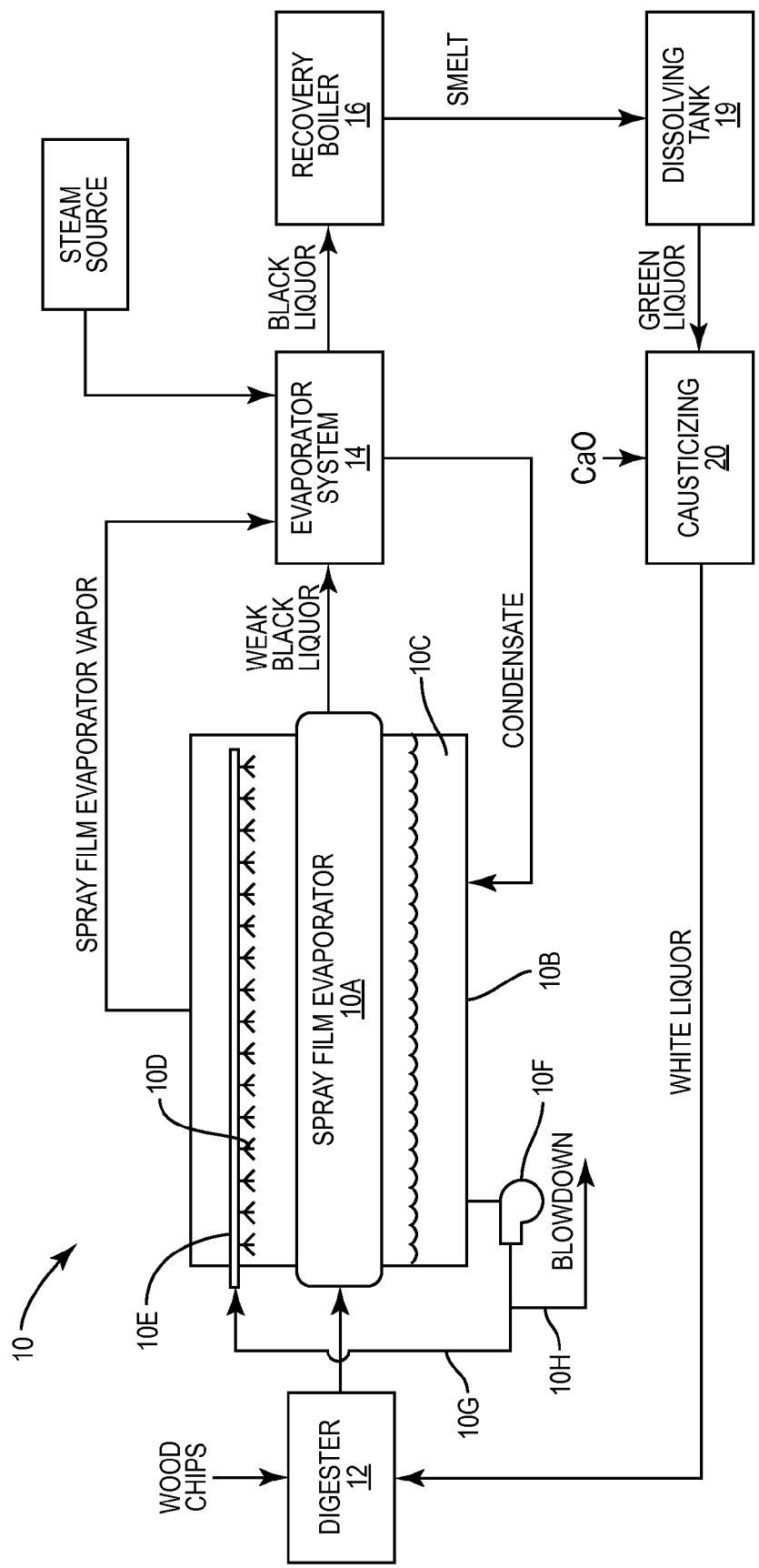
FIG. 2 is a schematic illustration of a wood pulping process where weak black liquor is directed through a spray film evaporator located upstream of an evaporation system and wherein the spray film evaporator cools the weak black liquor and extracts heat therefrom which is directed in the form of vapor to the downstream evaporation system.

FIGS. 1 and 2 show a wood pulping process that includes the spray film evaporator 10. Before discussing in more detail the function and operation of the spray film evaporator 10, it may be beneficial to generally review some of the basic processes that are found in a typical wood pulping process. In that regard, reference is made to FIGS. 1 and 2.

Referring to FIG. 1, wood chips are directed into a digester 12. The wood chips are mixed with pulping chemicals typically referred to as white liquor. White liquor contains sodium hydroxide (NaOH) and sodium sulfide ($Na_2S$). Digester 12 is operated under pressure and, in a typical process, the wood chips are cooked at a temperature on the order of 160-180° C. White liquor in the digester neutralizes the organic acids in the chemical matrix of the wood. Lignins and other organic material dissolve into the white liquor. The remaining material is pulp or wood fiber used in the papermaking process. White liquor is discharged from the digester 12 and, once discharged, the white liquor is referred to as weak black liquor.

Typically the weak black liquor produced by the digester 12 is cooled. In the case of the present invention, the weak black liquor is cooled by the spray film evaporator 10. Thereafter, the weak black liquor is directed to a downstream evaporation system referred to by the numeral 14. Downstream evaporation system 14 can comprise an evaporator or a series of evaporators such as multiple effect evaporators. In the evaporation system, the weak black liquor is concentrated. Weak black liquor typically has a solids content of about 15% by weight, which is far too low for combustion. By concentrating the weak black liquor in the evaporation system 14, the solids content can be substantially increased such that it is appropriate to treat the concentrated black liquor in a recovery boiler. While the degree of concentration can vary, generally the weak black liquor is concentrated to approximately 70-90 wt % of dry solids.

Typically the black liquor concentrated by the evaporators 14 is at a temperature of approximately 120° C. The black liquor is sprayed into a recovery boiler 16, which is typically operated at approximately 900° C. Effectively, the black liquor is atomized to droplets that, when sprayed into the recovery boiler 16, are exposed to hot gases and will undergo drying, pyrolysis, and char conversion. At the end of the char conversion, the droplets have been converted to small particles of smelt that generally consist of inorganic material, $Na_2S$, $Na_2CO_3$, $Na_2SO_4$, and NaCl in ionic form. The char conversion is usually completed before the smelt exits the boiler. The resulting combustible gases are burned completely. This produces steam in surrounding water pipes of the boiler. The steam is then used in other mill processes and is typically used to drive a steam turbine that produces electrical energy.

The resulting smelt enters a dissolving tank 19 where the smelt is dissolved in water to form what is referred to as green liquor. Green liquor is then sent to a causticizing plant 20, where the green liquor is reacted with lime, CaO, to convert Na2CO3 to NaOH. Na2S formed in the dissolving tank 19 simply passes through the causticizing plant 20 unchanged.

Causticized green liquor is referred to as white liquor and mostly contains NaOH and $Na_2S$. White liquor produced by the causticizing plant is returned to the digester 12 for reuse in pulping. In the causticizing plant 20, $Ca_2CO_3$ (lime mud) is precipitated. The precipitated $CaCo_3$ from the causticizing reaction is washed, and sent to a lime kiln where it is heated to a high temperature to regenerate CaO for reuse.

In wood pulping processes, it is desirable to remove chloride and potassium from the resulting ash without sacrificing substantial amounts of pulping chemicals. There are processes known that accomplish this objective. For example, see the disclosure found in U.S. patent application Ser. No. 13/709,140, entitled "CRP Purge Treatment", the contents of which are expressly incorporated herein by reference.

Returning to a discussion of the spray film evaporator 10, FIGS. 1 and 2 show the incorporation of the spray film evaporator in wood pulping processes. Spray film evaporator 10 includes a bundle of tubes 10A. The number of tubes in the spray film evaporator 10 can vary, but in a typical application they may number in the thousands. Furthermore, these tubes are relatively long and can extend in excess of 40 feet. In one example, the diameter of the tubes is relatively small and on the order of 1.5". Walls of the tube typically measure 0.035", but it is appreciated that wall thicknesses can vary.

Surrounding the bundle of tubes 10A is a housing or shell 10B. Formed in the bottom of the housing 10B is a reservoir 10C for holding a feed or condensate. A series of spray nozzles 10D are disposed over the bundle of tubes 10A and are fed with the feed or condensate by a feed line 10E. A pump 10F is provided and is operative to pump feed or condensate from the reservoir 10C to the feed line 10E. A feed or condensate blowdown line 10H is operatively connected to the recirculation line 10G to enable condensate to be appropriately wasted. Formed in the housing 10B is a vapor outlet and a feed or condensate inlet.

Turning to the embodiment shown in FIG. 1, the spray film evaporator 10 is disposed downstream of the digester 12. Weak black liquor produced by the digester is directed into and through the spray film evaporator 10. The temperature of the weak black liquor entering the spray film evaporator 10 is relatively high. In one example, the temperature of the weak black liquor produced by the digester 12 is approximately 230° F. The function of the spray film evaporator 10 is to cool the weak black liquor, and in the process recover heat therefrom. Accordingly, an evaporator feed, such as a condensate, is directed to the spray film evaporator 10. This feed is accumulated and held in the reservoir 10C of the evaporator. Pump 10F pumps the feed to the feed line 10E, and from there the feed is directed into the spray nozzles 10D. Spray nozzles 10D disperse the feed onto the tubes 10A of the bundle. The feed sprayed onto the outer surfaces of the tubes (which may typically be at a temperature of approximately 201° F.) boils or vaporizes, producing a vapor. See FIG. 1. This process effectively cools the weak black liquor which, in one example, exits the spray film evaporator 10 at a temperature of approximately 203° F. Produced vapor has many applications in a pulp mill operation. There are numerous heat consuming processes or components that can utilize the vapor produced by the spray film evaporator 10.

Turning to the FIG. 2 embodiment, heat recovered from the weak black liquor is used as an energy source for driving the downstream evaporation system 14. Condensate produced by the evaporation system 14 is routed back to the spray film evaporator 10. The condensate is sprayed on the outer surfaces of the tubes 10A through which hot weak black liquor flows. Heat from the weak black liquor boils or vaporizes the condensate, cooling the weak black liquor in the process. Vapor produced in the spray film evaporator 10 is directed to the downstream evaporation system 14 where it serves as a heat source, augmenting the energy supplied to the evaporation system by a steam source.

Evaporation system 14 in a pulp mill operation will typically include a multi-effect evaporator network. In a double-effect evaporation system, the vapor product off the first effect is used to provide energy for a second vaporization unit. This cascading of effects can continue for numerous stages. In the case of a typical multi-effect evaporation system, there is provided a source of steam that is utilized to provide energy to the first effect. The vapor produced by the first effect is then utilized in the second effect and so forth and so on. In the multi-effect evaporation system contemplated for the embodiment of FIG. 2, the evaporation system will produce concentrated weak black liquor, which is referred to as black liquor, and will produce a condensate. Portions of the produced condensate from the multiple effect evaporation system is directed into the condensate inlet of the spray film evaporator 10. Vapor produced by the spray film evaporator 10 is directed out the vapor outlet and is directed to the evaporation system 14 where the heat associated therewith is utilized to provide additional energy to the evaporation system 14.

Figure 3:
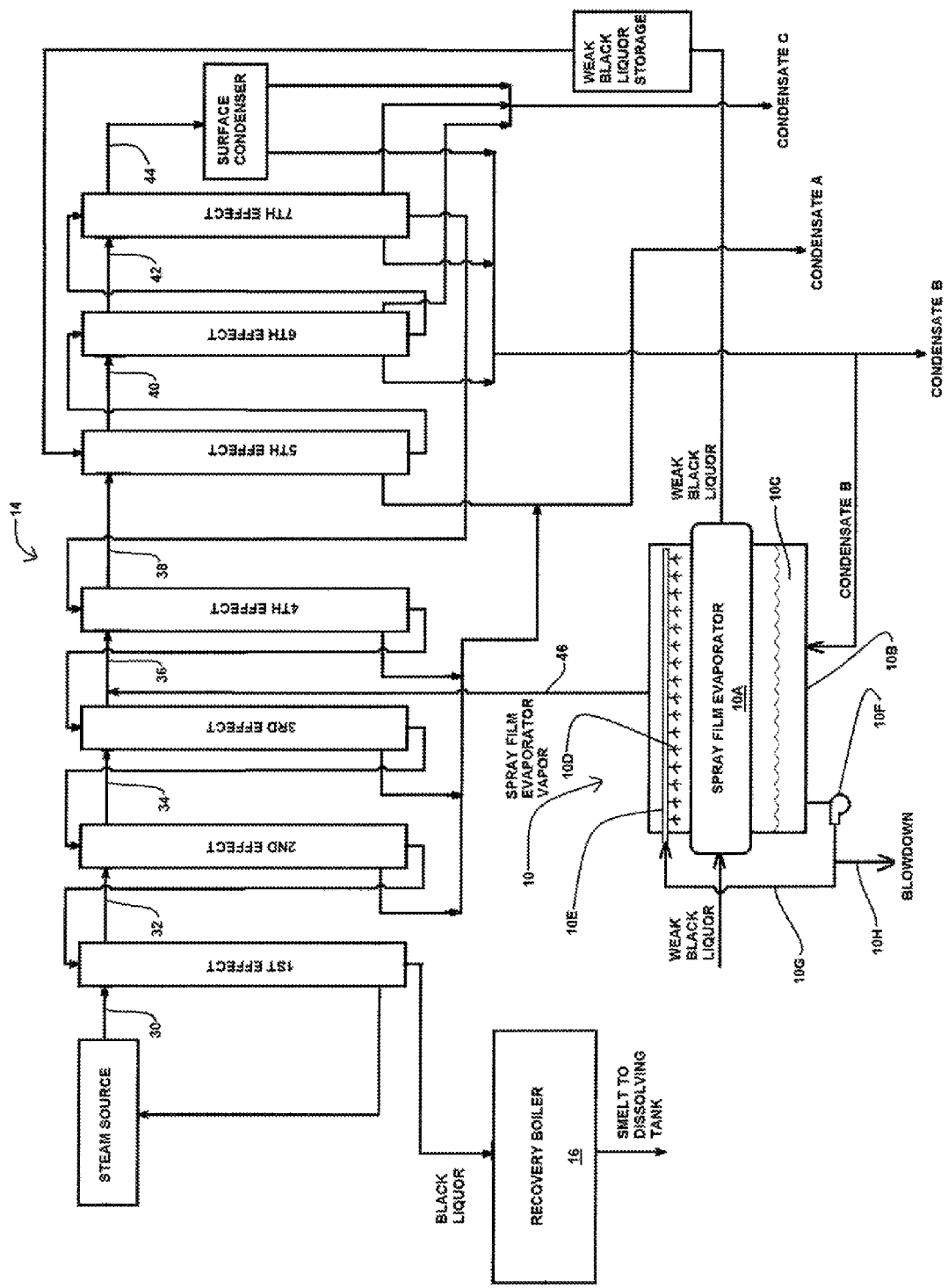
FIG. 3 is a schematic illustration of a portion of a wood pulping process illustrating the spray film evaporator and its relationship to a downstream multi-effect evaporation system.

The principal function of the evaporation system 14 is to concentrate the weak black liquor such that it can be appropriately burned in the recovery boiler 16. Various evaporator designs can be employed. FIG. 3 shows one exemplary multi-effect evaporator design and its relationship to the spray film evaporator 10. This exemplary design, referred to generally by the numeral 14, comprises seven effects and could be of the filling film type or other suitable evaporator types. To concentrate the weak black liquor exiting the spray film evaporator 10, the weak black liquor cooled by the spray film evaporator is first directed into the fifth effect and partially evaporated to produce a more concentrated weak black liquor that exists the fifth effect and is then directed in a backward direction to the sixth effect. In the sixth effect, the weak black liquor is further concentrated. As FIG. 3 shows, the weak black liquor concentrated in the sixth effect is then directed to the seventh effect and from there the weak black liquor moves in a forward direction back to the fourth, third, second and first effects. Because the weak black liquor is heated and evaporated in the various effects, then it follows that the weak black liquor progressively becomes more concentrated as it moves from one effect to the next succeeding effect. Finally, the concentrate produced by the first effect becomes the concentrated black liquor which typically has a solids content of approximately 70-90% and, as discussed above, is directed to the recovery boiler 19.

To provide the energy for evaporating the weak black liquor, live steam from a steam source is directed through line 30 to the first effect. See FIG. 3. The live steam concentrates the weak black liquor passing through the first effect and, in the process, a vapor is produced in the first effect. Condensate resulting from the live steam is collected and returned to the steam source. Vapor produced as a result of vaporizing the black liquor in the first effect is direct through line 32 to the second effect where that vapor is used to evaporate portions of the weak black liquor in the second effect. Evaporating the black liquor in the second effect produces vapor which is directed through line 34 to the third effect where the vapor is utilized to evaporate portions of the black liquor in the third effect. This process continues and as those skilled in the art will appreciate, the vapor produced in the third effect is utilized to power the fourth effect and so forth and so on. As FIG. 3 shows, vapor lines 36, 38, 40 and 42 depict the flow of vapor from one effect to a succeeding effect. The seventh effect also produces a vapor that is directed therefrom through line 44 to a surface condenser.

As discussed earlier, the vapor produced by the spray film evaporator 10 can be utilized to power the multi-effect evaporation system 14. In the case of this example, the vapor produced by the spray film evaporator 10 is directed through line 46 to the fourth effect. In this example, the vapor produced by the third effect, along with the vapor produced by the spray film evaporator 10, is effectively combined to provide the source of energy for the fourth effect. It is understood by those skilled in the art that the vapor from the spray film evaporator 10 could be directed to one or more other effects, depending upon certain conditions. In this case, the heat or vapor recovered by the spray film evaporator 10 is directed to an effect near the middle of the evaporator train. This is because it is desirable to cool the weak black liquor to below its atmospheric boiling point before storing it in a normal (atmospheric pressure) storage tank.

Each effect produces a condensate as a result of the vapor vaporizing weak black liquor. Some of the condensates are more contaminated with methanol than others. In this particular example, the condensates are combined and grouped into three groups: condensate A, condensate B, and condensate C.

As seen in FIG. 3, in this example, condensate A comprises condensates from the second, third, fourth and fifth effects. In this example, condensates produced by the sixth and seventh effects and the surface condenser are split into two streams, a more contaminated stream and a less contaminated stream. As discussed below, the contaminant that is of most concern is methanol. In any event, the more contaminated streams from these sources are combined to form condensate c. Thus, in this example, condensate C is the combined, more contaminated, condensate streams from the sixth and seventh effects and the surface condenser.

Condensate B, referred to in FIG. 3, is the combined less contaminated condensate streams from the sixth effect, seventh effect and the surface condenser. In this example, at least a portion of condensate B is directed to the spray film evaporator 10 and used for cooling the weak black liquor passing through the spray file evaporator. In some cases, all or substantially all of condensate B could be routed to the spray film evaporator 10. In other cases, condensate B can be split or divided and only a select portion of the condensate B is directed to the spray film evaporator 10.

The contamination in these condensates results from the vaporization of the weak black liquor. While there may be numerous contaminants of interest, one contaminant of particular interest is methanol. In the example shown in FIG. 3, it is estimated that the methanol concentration in condensate A will be approximately 50-100 ppm and that the methanol concentration in condensate B will be less than 1,000 ppm and the methanol concentration in condensate C may be in excess of 20,000 ppm.

In the embodiment discussed above, there is shown only one spray film evaporator 10 cooling the weak black liquor and supplying heat energy to the evaporation system 14. In some applications there may be two or more weak black liquor coolers, in the form of spray film evaporators, and the vapor from these spray film evaporators can be strategically directed and used by the evaporation system 14.

As discussed above, the process of the present invention effectively uses condensate from the downstream evaporation system 14 to recover heat from the weak black liquor. Also, the process of the present invention is effective to remove volatile contaminants from the condensate. Boiling the condensate on the outside of the tubes allows the condensate to be cleaned by preferentially volatizing foul components such as methanol and total reduced sulfur gases.

There are numerous advantages to utilizing the spray film evaporator 10 upstream of the evaporation system 14 in a wood pulping process. The flow of weak black liquor through the tubes reduces fiber plugging problems that are common with liquid-to-liquid heat exchangers and simplifies cleaning if there is an upset that plugs the tubes with fiber. In addition, boiling the condensate on the outside of the tubes for heat recovery is more efficient than a liquid-to-liquid heat exchangers and, as discussed above, also improves the overall quality of the condensate. Furthermore, the utilization of the spray film evaporator 10 eliminates the foaming risk associated with conventional flash tanks.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method of cooling and recovering heat from weak black liquor produced in a pulp mill, comprising:
   digesting fibers in a digester to form weak black liquor;
   directing the weak black liquor through a series of tubes that form a part of a spray film evaporator;
   cooling and recovering heat from the weak black liquor passing through the spray film evaporator by:
   i. directing a feed to the spray film evaporator;
   ii. spraying the feed onto the tubes of the spray film evaporator and vaporizing the feed to produce a vapor; and
   iii. directing the vapor from the spray film evaporator and wherein the heat associated with the vapor can be utilized as a heat source for other processes in the pulp mill.

2. The method of claim 1 including directing the vapor produced by the spray film evaporator to a multi-effect evaporation system.

3. The method of claim 2 including feeding at least a portion of the vapor produced by the spray film evaporator to an intermediate effect of the multi-effect evaporation system.

4. The method of claim 2 including directing weak black liquor from the spray film evaporator to an intermediate effect of the multi-effect evaporation system and from the intermediate effect directing the weak black liquor rearwardly through one or more effects and then reversing the direction of the weak black liquor by directing the weak black liquor forwardly through one or more effects.

5. The method of claim 2 wherein the multi-effect evaporator produces a series of condensates and the method includes directing one or more, but not all, of the condensates from the multi-effect evaporation system to the spray film evaporator and vaporizing at least a portion of the condensates.

6. The method of claim 1 including the reducing the temperature of the weak black liquor in the spray film evaporator at least 20° F.

7. A method of treating weak black liquor produced in a pulp mill, comprising:
digesting fibers in a digester to form weak black liquor;
directing the weak black liquor through a series of tubes that form a part of a spray film evaporator;
cooling the weak black liquor in the spray film evaporator;
after cooling the weak black liquor, directing the weak black liquor to a multi-effect evaporation system and concentrating the weak black liquor therein to produce a concentrated black liquor and condensate;
directing the concentrated black liquor to a recovery boiler;
recovering heat from the weak black liquor by spraying condensate produced by the multi-effect evaporation system onto outside surfaces of the tubes and utilizing heat recovered from the weak black liquor to heat and vaporize the condensate which produces a vapor; and
directing the vapor to the multi-effect evaporation system and utilizing the heat associated with the vapor to concentrate the weak black liquor in the multi-effect evaporation system.

8. The method of claim 7 including feeding at least a portion of the vapor produced by the spray film evaporator to an intermediate effect of the multi-effect evaporation system.

9. The method of claim 7 including feeding the weak black liquor from the spray film evaporator into an intermediate effect and therefrom rearwardly through one or more effects and thereafter reversing the direction of the weak black liquor and directing the weak black liquor forwardly through internal or external heat exchangers and then through one or more effects located on a forward side of the effect initially receiving the weak black liquor.

10. The method of claim 7 wherein the multiple effect evaporation system produces a series of condensates and the method includes combining a series, but not all, of the condensates and directing the combined condensates to the spray film evaporator and vaporizing at least a portion of the combined condensates.

11. The method of claim 7 further including:
directing the vapor produced by the spray film evaporator to an intermediate effect of the multi-effect evaporator system; and
directing the weak black liquor cooled by the spray film evaporator to one or more feed flash tanks of the multi-effect evaporation system thereafter to the last effect, and thereafter directing the weak black liquor in a forward direction through the multi-effect evaporation system.

12. The method of claim 11 wherein the multi-effect evaporation system produces a series of condensates, and the method includes combining less than all of the condensates and directing the combined condensates to the spray film evaporator and evaporating at least a portion of the combined condensates.

13. The method of claim 11 wherein the multi-effect evaporation system produces a series of condensates, and wherein the method includes combining two or more condensates produced by the multi-effect evaporation system and directing the combined condensates to the spray film evaporator, and wherein the combined condensates directed to the spray film evaporator is less contaminated than other condensates produced by the spray film evaporator and more contaminated than still other condensates.

14. The method of claim 7 wherein the spray film evaporator includes a housing and a bundle of tubes contained in the housing and wherein cooling the weak black liquor includes directing the weak black liquor through the bundle of tubes and cooling the weak black liquor by spraying the condensate onto the outside surfaces of the bundle of tubes contained within the housing.

* * * * *